United States Patent
Biesdorf et al.

(10) Patent No.: US 11,977,878 B2
(45) Date of Patent: May 7, 2024

(54) SYSTEM AND METHOD FOR MANAGING SOFTWARE SERVICES IN BUILDING CUSTOMIZED SOFTWARE

(71) Applicant: Siemens Aktiengesellschaft, Munich (DE)

(72) Inventors: Andreas Biesdorf, Trier (DE); Christoph Brand, Princeton, NJ (US); Martin Kramer, Munich (DE); Sandeep Krishnan, Karnataka (IN); Pravin Kumar, Karnataka (IN); Puneet Shukla, Maharashtra (IN); Girish Suryanarayana, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 16 days.

(21) Appl. No.: 17/740,632

(22) Filed: May 10, 2022

(65) Prior Publication Data
US 2022/0365774 A1   Nov. 17, 2022

(30) Foreign Application Priority Data

May 12, 2021   (EP) .................................... 21173620

(51) Int. Cl.
*G06F 8/70*   (2018.01)
(52) U.S. Cl.
CPC ..................................... *G06F 8/70* (2013.01)
(58) Field of Classification Search
CPC ........................................................ G06F 8/70
USPC ................................................... 717/105–121
See application file for complete search history.

(56) References Cited

U.S. PATENT DOCUMENTS

| | | | |
|---|---|---|---|
| 7,069,560 B1* | 6/2006 | Cheyer ............... | G06F 16/3334 709/202 |
| 7,089,560 B1* | 8/2006 | Uhler ...................... | G06F 9/465 709/201 |
| 7,926,029 B1* | 4/2011 | Stoyen ...................... | G06F 8/20 717/102 |
| 8,006,223 B2* | 8/2011 | Boulineau ........ | G06Q 10/06313 705/7.29 |

(Continued)

OTHER PUBLICATIONS

Strategies for Software Reuse: A Principal Component Analysis of Reuse Practices, IEEE, pp. 825-837 (Year: 2003).*

(Continued)

*Primary Examiner* — Anil Khatri
(74) *Attorney, Agent, or Firm* — Schmeiser, Olsen & Watts LLP (57) ABSTRACT

A system and method for managing software services is provided. The method includes receiving a query from a client device, by a processing unit, for accessing software package corresponding to at least one building block stored in a repository, wherein the building block is a software component associated with a software service, configured for reuse in a plurality of engineering applications. The method further includes identifying the software package corresponding to the building block from the repository based on the query. The method further includes providing access to the software package corresponding to the building block, on the client device, through an integrated development environment.

13 Claims, 8 Drawing Sheets

(56) References Cited

U.S. PATENT DOCUMENTS

| | | | | |
|---|---|---|---|---|
| 8,359,566 | B2 * | 1/2013 | Chaar | G06F 8/36 |
| | | | | 717/121 |
| 8,607,190 | B2 * | 12/2013 | Coldicott | G06N 5/025 |
| | | | | 717/106 |
| 8,930,879 | B2 * | 1/2015 | Fernandez | G06F 8/20 |
| | | | | 717/109 |
| 10,248,386 | B2 * | 4/2019 | Woodward | G06F 8/35 |
| 10,983,764 | B2 * | 4/2021 | Bruderek | G06F 9/45558 |
| 11,106,459 | B2 * | 8/2021 | Gu | G06F 8/71 |
| 11,321,054 | B2 * | 5/2022 | Gaitonde | G06F 8/60 |
| 11,645,492 | B2 * | 5/2023 | Lambert | G05D 1/0088 |
| | | | | 706/21 |
| 2018/0373507 | A1 | 12/2018 | Cocycles | |
| 2019/0129712 | A1 * | 5/2019 | Hawrylo | G06F 8/20 |
| 2020/0159526 | A1 * | 5/2020 | Sivadasan | G06F 8/73 |

OTHER PUBLICATIONS

Bachmann et al., "Managing Variability in Software Architectures", ACM, pp. 126-132 (Year: 2001).*
Linden et al, "Creating Architectures with Building Blocks", IEEE, pp. 51-60 (Year: 1994).*
Selm et al, "DCIS Cube: Defining Architecture Building Blocks for Next Generation Deployable IT systems", IEEE, pp. 679-684 (Year : 2018).*
Tibermacine et al, "Component-Based Specification of Software Architecture Constraints", ACM, pp. 31-40 (Year: 2011).*
Tan et al, "Poster: OpenQUIC: Software-defined Transmission like Building Blocks", ACM, pp. 526-527 (Year: 2020).*

* cited by examiner

SYSTEM AND METHOD FOR MANAGING SOFTWARE SERVICES IN BUILDING CUSTOMIZED SOFTWARE

CROSS-REFERENCE TO RELATED APPLICATIONS

This application claims priority to EP Application No. 21173620.2, having a filing date of May 12, 2021, the entire contents of which are hereby incorporated by reference.

FIELD OF TECHNOLOGY

The following relates to managing software services, and more particularly relates to a system and method for managing software services.

BACKGROUND

Digitalization calls for faster development of software services for various applications. Further, there is an increasing demand for customized software services for different applications. This is because standard software services may be application-specific and may not be suitable for other use-cases. Such standard software services may have to be suitably modified in order to make it suitable for specific use-cases.

However, development of custom software services is effort intensive and time-consuming and may lead to deferred deployment of the software services for use by end-users. In order to develop custom software services in minimum time, it may be essential to reuse existing software services for building the custom software service. However, existing software services may be built as monoliths and may not be modular enough to facilitate reusability. Further, visibility of existing software services on a cloud platform may be limited.

In light of the above, there exists a need for managing software services for improved reusability and faster deployment.

SUMMARY

An aspect relates to a system and method for managing software services.

The aspect of embodiments of the present invention are achieved by a method for managing software services as disclosed herein.

The method includes receiving a query by a processing unit, from a client device, for accessing software package corresponding to at least one building block in a repository. The building block is a software component associated with a software service, configured for reuse in a plurality of engineering applications.

The software package may include, but is not limited to, source code and object code associated with the building block, installers, data associated with an execution environment of the building block, additional software components, metadata files, configuration files etc. The building block may be enhanced or modified using other software components. The building block is built by a developer based on at least one of predefined code templates and guidelines for developing building blocks. The term 'repository' as used herein may refer to a database storing software packages, metadata files and configuration files associated with one or more building blocks. In an embodiment, the query is a natural language query comprising one or more keywords that may be used to identify the building block. The term 'natural language' as used herein, refers to any language that may be used by humans for communicating an idea, for example, English, French, Spanish etc.

Embodiments of the present invention enable a user to search for building blocks stored in a repository using natural language queries.

The method further includes identifying the software package corresponding to the building block from the repository based on the query. In an embodiment, the step of identifying the building block includes generating a vector representation of the query using a natural language processing algorithm. Further, metadata files associated with each of one or more building blocks in the repository are parsed to generate metadata. Further, vector representations of the metadata are determined using a natural language processing algorithm. Further, the vector representation of the query is compared with the vector representation of the metadata associated with each of the one or more building blocks stored in the repository. Further, the building block corresponding to the query is identified based on the comparison.

Embodiments of the present invention are capable of automatically identifying the building blocks based on the query. Therefore, the user is saved from the burden of having to memorize logic statements or folder paths for accessing codes stored in different memory locations of a system.

The method further includes providing access to the software package corresponding to the building block, on the client device, through an integrated development environment. In an embodiment, the step of providing access to the building block includes receiving one or more inputs for modifying the building block from the client device through the integrated development environment. Further, the building block is modified based on the one or more inputs. In an embodiment, the method may further comprise providing recommendations for modifying the building block, on the client device, based on the query.

Embodiments of the present invention provide the user with access to readily available building blocks. As a result, the time required for complete development of an engineering application is less compared to building the engineering application from scratch.

In an embodiment, the method may further comprise generating the software package based on a code for the building block and an execution environment associated with the code. The term 'code' as used herein refers to source code associated with the building block. Further, a configuration file is generated for the building block based on the software package. Further, the configuration file is linked to a metadata file associated with the building block to generate an executable component. The executable component enables containerized execution of the building block in the execution environment.

In an embodiment, the method may further comprise identifying one or more add-on components from the repository based on the identified building block. The term 'add-on components' as used herein may refer to supplementary software components or services that render additional functionalities to the building block. In other words, the add-on components enable modification of the building block for specific purposes.

Embodiments of the present invention automatically identify add-on components corresponding to a building block in order to suit the building block for a specific purpose. Therefore, the user need not search for add-on components manually.

The method may further comprise identifying engineering dependencies among a plurality of building blocks. In an embodiment, the engineering dependencies are identified based on a pre-existing set of specifications associated with at least one of the building blocks. The pre-existing set of specifications may be stored in, for example, knowledge bases, metadata files, configuration files, text files etc. Further, an orchestrated service is configured from the plurality of building blocks based on the engineering dependencies identified. The orchestrated service is associated with a specific engineering application. The term 'orchestrated service' as used herein refers to a plurality of building blocks that are configured, managed and coordinated to provide a specific engineering solution to an end-user through a client environment.

Embodiments of the present invention automatically identify engineering dependencies between building blocks. Therefore, the user need not explicitly define engineering dependencies between the building blocks.

In an embodiment, the method further includes dynamically generating plumbing code for facilitating communication among the plurality of building blocks in the orchestrated service. In a further embodiment, the method may further comprise validating the orchestrated service based on a compatibility of the plurality of building blocks.

The method may further comprise deploying the orchestrated service in a client environment. The client environment enables access to the orchestrated service from one or more user devices. The user devices may include electronic devices such as personal computers, smartphones, workstations etc. associated with end-users of the engineering application. The client environment may include, but not limited to, a local container environment, an on-premise cluster environment and a cloud-based cluster environment.

The aspect of embodiments of the present invention is achieved by an apparatus for managing software services as disclosed herein. The apparatus includes one or more processing units and a memory unit communicatively coupled to the one or more processing units. The memory unit includes a software service management module stored in the form of machine-readable instructions executable by the one or more processing units, wherein the software service management module is configured to perform method steps according to any of the methods as described above.

The aspect of embodiments of the present invention is also achieved by a cloud-based system for managing software services as disclosed herein. The system includes one or more devices and an apparatus as described above, communicatively coupled to the one or more client devices, wherein the apparatus is configured to manage software services based on queries received from the one or more client devices according to any of the methods as described above.

The aspect of embodiments of the present invention is also achieved by a computer-readable medium, on which program code sections of a computer program are saved, the program code sections being loadable into and/or executable by a processor which performs the method as described above when the program code sections are executed.

The realization of embodiments of the invention by a computer program product (non-transitory computer readable storage medium having instructions, which when executed by a processor, perform actions) and/or a non-transitory computer-readable storage medium has the advantage that computer systems can be easily adopted by installing computer program in order to work as proposed by embodiments of the present invention. The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

The above-mentioned attributes, features, and advantages of embodiments of the present invention and the manner of achieving them, will become more apparent and understandable (clear) with the following description of embodiments of the invention in conjunction with the corresponding drawings. The illustrated embodiments are intended to illustrate, but not limit the invention.

BRIEF DESCRIPTION

Some of the embodiments will be described in detail, with reference to the following figures, wherein like designations denote like members, wherein.

DETAILED DESCRIPTION

Figure 1A:
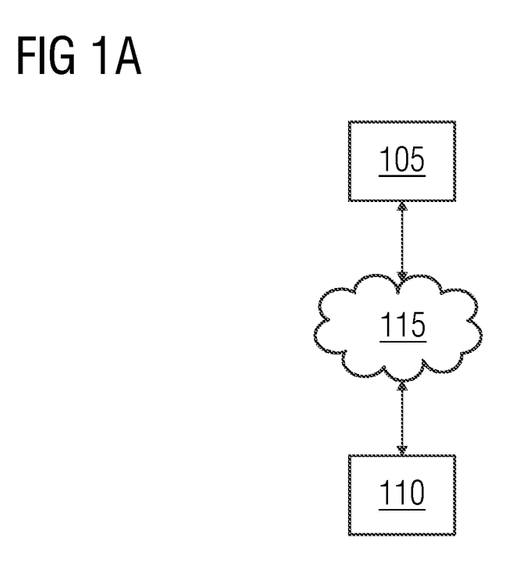
FIG. 1A illustrates a block diagram of an environment of a system for managing software services, according to an embodiment of the present invention.

FIG. 1A illustrates a block diagram of an environment 100 of a system 105 for managing software services, according to an embodiment of the present invention. The system 105 is communicatively coupled to one or more client devices 110. Each of the client devices 110 is connected to the system 105 via a network 115, for example, local area network (LAN), wide area network (WAN), WiFi, etc.

In an embodiment, the system 105 is cloud-based, i.e., the system 105 is deployed in a cloud computing environment. As used herein, "cloud computing environment" refers to a processing environment comprising configurable computing physical and logical resources, for example, networks, servers, storage, applications, services, etc., and data distributed over the network 115, for example, the internet. The cloud computing environment provides on-demand network access to a shared pool of the configurable computing physical and logical resources.

The client device 110 includes a device that provides access to a user of the client device 110 to reusable software components from a repository 117 associated with the system 105. More specifically, the device may be configured to provide access to software packages in the repository 117.

The client device 110 also includes electronic devices used by a user. In an embodiment, the client device 110 may be used by the user to modify code associated with one or more software packages accessed from the repository 117. The code may be modified by the user via a graphical user interface of an end user web application on the client device 110. In another embodiment, the user may send a request to the system 105, from the client device 110, to access the code via the network 115. In an implementation, the user may be provided access to a local copy of code downloaded, from the system 105, onto the client device 110 for modification. In another implementation, the user may be provided access to the original code stored in a repository 117.

Figure 1B:
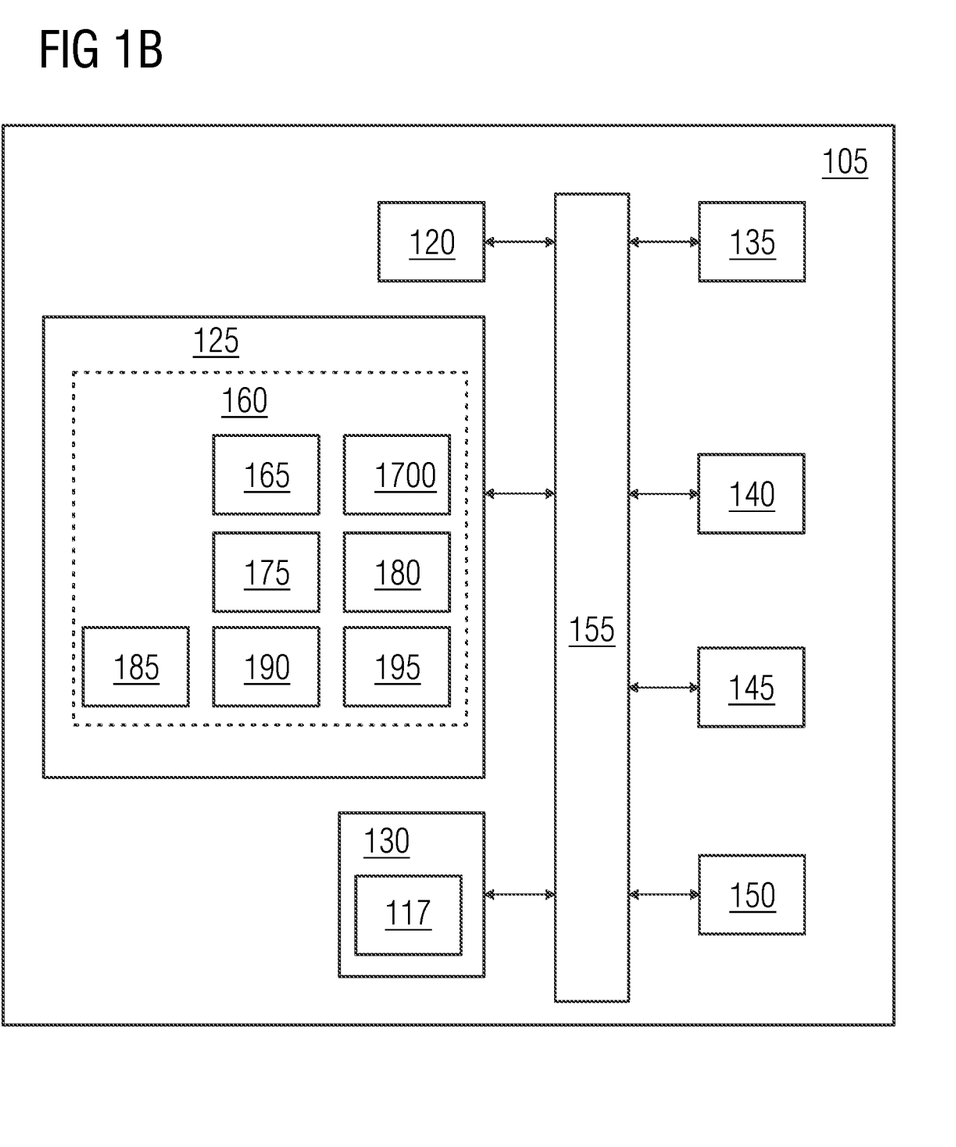
FIG. 1B illustrates a block diagram of a system for managing software services, according to an embodiment of the present invention.

The system 105 comprises a processing unit 120, a memory 125, a storage unit 130, a communication module 135, a network interface 140, an input unit 145, an output unit 150, a standard interface or bus 155 as shown in FIG. 1B. The system 105 can be a (personal) computer, a workstation, a virtual machine running on host hardware, a microcontroller, or an integrated circuit. As an alternative, the system 105 can be a real or a virtual group of computers (the technical term for a real group of computers is "cluster", the technical term for a virtual group of computers is "cloud"). The term 'processing unit', as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 120 may also include embedded controllers, such as generic or programmable logic devices or arrays, application specific integrated circuits, single-chip computers, and the like. In general, a processing unit 120 may comprise hardware elements and software elements. The processing unit 120 can be configured for multithreading, i.e., the processing unit 120 may host different calculation processes at the same time, executing the either in parallel or switching between active and passive calculation processes.

The memory 125 may include one or more of a volatile memory and a non-volatile memory. The memory 125 may be coupled for communication with the processing unit 120. The processing unit 120 may execute instructions and/or code stored in the memory 125. A variety of computer-readable storage media may be stored in and accessed from the memory 125. The memory 125 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The memory 125 comprises a software service management module 160 comprising a query processing module 165, an identification module 170, access control module 175, a recommendation module 180, a containerization module 185, an orchestration module 190 and a deployment module 195.

The query processing module 165 is configured for receiving a query, from a client device 110, for accessing a software package corresponding to a building block. The software package is stored in the repository 117. The identification module 170 is configured for identifying the software package corresponding to the building block from the repository 117 based on the query. The identification module 170 is also configured for identifying one or more add-on components from the repository 117 based on the identified building block. The access control module 175 is configured for providing access to the software package corresponding to the building block through an integrated development environment on the client device 110.

The recommendation module 180 is configured for providing recommendations for modifying the building block based on the query. The containerization module 185 is configured for creating the software package by bundling a code for the building block with an execution environment associated with the code. The containerization module 185 is further configured for generating a configuration file for the building block based on the software package generating an executable component associated with the building block. The containerization module 185 further links the configuration file to a metadata file associated with the building block to generate an executable component. The executable component enables containerized execution of the building block in the execution environment.

The orchestration module 190 is configured to identify engineering dependencies between the building block and the one or more add-on components. The orchestration module 190 is further configured to configure an orchestrated service specific to an engineering application from the building block and the one or more add-on components. In addition to the above, the orchestration module 190 is further configured to dynamically generate plumbing code for facilitating communication between the building block and the one or more add-on components in the orchestrated service. Further, the orchestration module 190 may also validate the orchestrated service based on the engineering dependencies identified. The deployment module 195 is configured for deploying the orchestrated service in a client environment (not shown).

The software service management module 160 may be stored in the memory 125 in the form of machine-readable instructions and executable by the processing unit 120. These machine-readable instructions when executed by the processing unit 120 causes the processing unit 120 to manage software services based on queries received from the one or more client devices 110.

The storage unit 130 comprises a non-volatile memory which stores codes associated with one or more software services, metadata associated with the one or more software services and so on. The non-volatile memory acts as the repository 117 associated with the system 105. The input unit 145 may include input means such as keypad, touch-sensitive display, camera, etc. capable of receiving input signal. The bus 155 acts as interconnect between the processing unit 120, the memory 125, the storage unit 130, and the network interface 140.

The communication module 135 enables the system 105 to communicate with the client device 110. The communication module 135 may support different standard communication protocols such as Transport Control Protocol/Internet Protocol (TCP/IP), Profinet, Profibus, and Internet Protocol Version (IPv).

The client device 110 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

Those of ordinary skilled in the art will appreciate that the hardware depicted in FIGS. 1A and 1B may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to the present disclosure.

In order to make a software component reusable, a developer of the software component is provided with a set of predefined guidelines. In one embodiment, the guidelines are provided to the developer through a chatbot interface provided on the client device 110. The chatbot interface enables the developer to input one or more queries associated with development of building blocks. The queries may be input in the form of text input, voice input, gesture input etc. The queries may be provided in any natural language, for example, English, German, French etc. The chatbot interface further transmits the query to the system 105. The system 105 further parses the query to generate one or more objects. The one or more objects are further used to query an ontology data model. The ontology data model may include information associated with properties of building blocks. Based on the querying, the system 105 may generate a response to the query from the developer. The response is further outputted to the user through the chatbot interface. In addition, the developer may also be provided with one or more code templates. The developer may further insert code fragments into the code template in order to build the building block. Further, the building block may be containerized as explained using FIG. 2.

Figure 2:
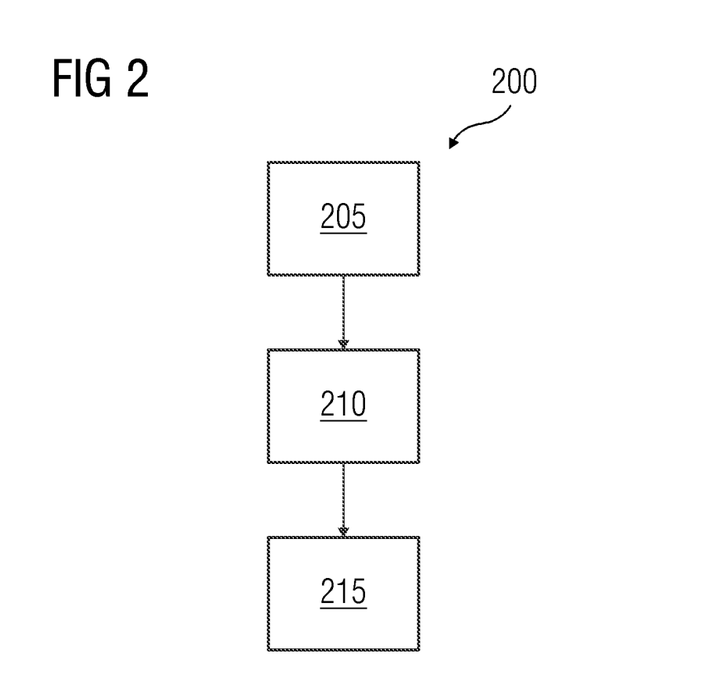
FIG. 2 shows a flowchart of a method 200 for containerization of a building block, in accordance with an embodiment of the present invention.

FIG. 2 shows a flowchart of a method 200 for containerization of a building block, in accordance with an embodiment of the present invention.

At step 205, a software package corresponding to a reusable software component is generated based on the building block and an execution environment associated with the code. The software package is generated by bundling the code with information associated with the execution environment for executing the code.

At step 210, a configuration file for the building block is generated based on the software package. The configuration file comprises information associated with the software package. In an example, the configuration file may be a DEV file. The configuration file specifies how the building block may interact with one or more hardware components associated with the system 105 during execution.

At step 215, the configuration file is linked to a metadata file associated with the building block to generate an executable component. In an embodiment, the configuration file is linked by providing a link to the configuration file in a metadata file associated with the building block. The metadata file comprises metadata associated with the building block. The metadata may include, but not limited to, a name of the building block, a link to the code of the building block in the repository 117, deployment information, data required to load the building block into the integrated development environment, functionalities, hardware and software requirements, and engineering dependencies of the building block on other software services. The executable component enables containerized execution of the building block in the execution environment. In other words, the building block may be executed in the execution environment, based on the executable component, independent of infrastructure.

Figure 3:
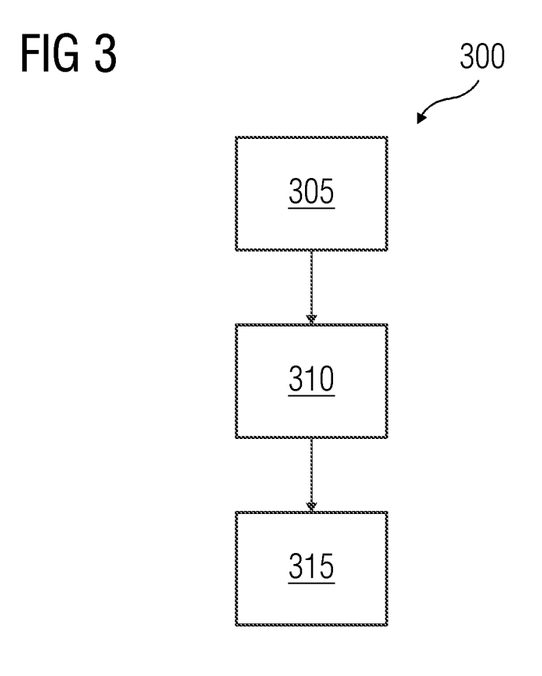
FIG. 3 shows a flowchart of a method 300 for managing software services, in accordance with an embodiment of the present invention.

FIG. 3 shows a flowchart of a method 300 for managing software services, in accordance with an embodiment of the present invention. At step 305, a query for accessing software package corresponding to at least one building block is received, by the processing unit 120, from the client device 110. In an embodiment, the query is a request comprising an identifier of the building block.

A user of the client device 110 provides the query on a user interface associated with the client device 110. For example, the user interface may provide the user to select an option to add a building block to an editing canvas.

Figure 4A:
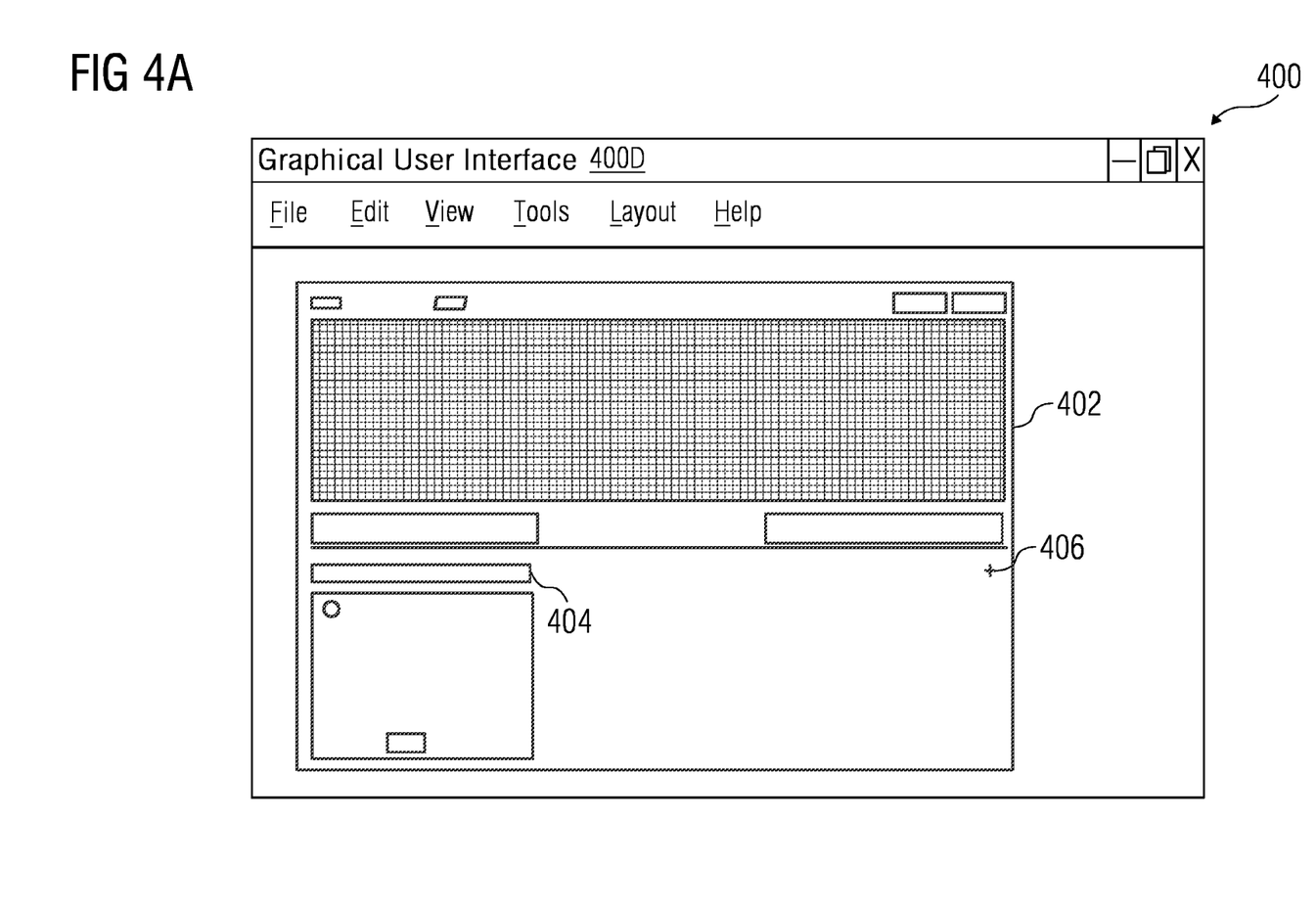
FIG. 4A illustrates an example of a Graphical User Interface associated with an editing canvas as seen on a client device, in accordance with an embodiment of the present invention.

FIG. 4A illustrates an example of a Graphical User Interface (GUI) 400 associated with an editing canvas 402 as seen on the client device 110, in accordance with an embodiment of the present invention. The GUI 400 enables the user to search for building blocks or reusable software components in a search bar 404 using natural language queries. In the present example, the user is searching for a building block called 'Similar defect recommendations'.

At step 310, the software package corresponding to the building block is identified from the repository 117 based on the query. In an embodiment, the software package is identified by firstly, generating a vector representation of the query using a natural language processing algorithm. In order to generate the vector representation, text in the query is pre-processed using suitable pre-processing techniques including, but not limited to, stopword removal, stemming, lemmatization and co-occurrence identification. Upon pre-processing, a text vectorization/embedding algorithm is used to convert the text to vector representation. The text vectorization algorithm takes a text as input and generates a numerical output, i.e., the vector representation of the query. Non-limiting examples of text vectorization algorithms include binary term frequency, Bag of Words (BoW) term frequency, Word2Vec and Normalized Term Frequency.

Further, metadata files associated with each of the building blocks is parsed to generate a parse tree comprising metadata corresponding to each of the building blocks. The parse tree is further used to generate a vector representation of the metadata corresponding to each of the building blocks. The vector representation of the metadata may be generated using similar pre-processing techniques and text vectorization algorithms as explained above.

The vector representation of the query is further compared with the vector representation of the metadata corresponding to each of the building blocks. In an embodiment, the vector representations are compared using cosine similarity. Further, based on the cosine similarity of the vector representations, the building block that is matching with the query is identified. For example, if the cosine similarity corresponding to vector representations of the query and metadata of a first reusable service is greater than or equal to a threshold value, say 0.9, then the first building block is identified as the right match for the query. In another example, a plurality of building blocks having cosine similarity greater than the threshold value may be identified. Further, names of the plurality of building blocks may be displayed on the user interface in order to enable the user to select a building block of his/her choice.

The names of the plurality of building blocks may be ranked, while displaying, based on various factors. The factors may include but not limited to, reusability, modularity, understandability, quality of code and usage feedback. The reusability and modularity of the code may be predetermined using static code analysis tools. The understandability of the code may be predetermined using static code analysis tools. The understandability of the code may also be determined by parsing of natural language comments and documentation associated with the code using parsers. The quality of code is predetermined using at least one of static analysis tools and dynamic analysis tools. The term 'usage feedback' as used herein refers to feedbacks collected from previous users of the building blocks. The feedbacks may be in the form of, for example, ratings, comments and so on. Further, the user may add the required building block or component from the list to an editing canvas by selecting an add option. In the present example, the add option is indicated by a '+' option 406.

At step 315, access to a code of the identified building block is provided through an integrated development environment on the client device 110. The integrated development environment may be for example, a web-based source code editor or a standalone source code editor on the client device 110.

Figure 4B:
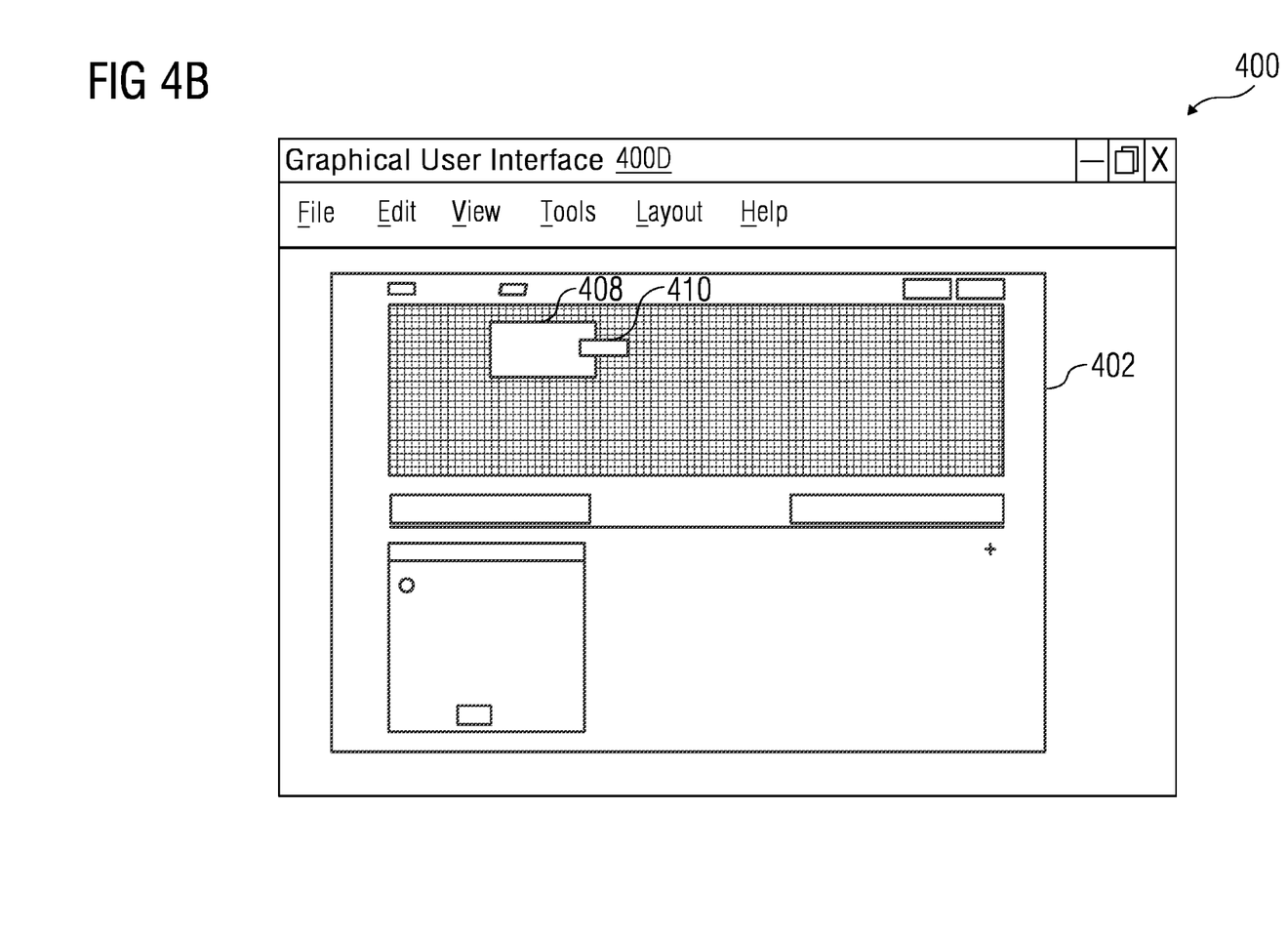
FIG. 4B illustrates an example of the Graphical User Interface providing access to the code of the building block, in accordance with an embodiment of the present invention.

FIG. 4B illustrates an example of the GUI 400 providing access to the code of the building block, in accordance with an embodiment of the present invention. As seen, the editing canvas 402 includes a virtual representation 408 of the building block in the form of a rectangle. The rectangle is overlaid with a tab 410 that provides the user an option to access or open the code of the building block in the integrated development environment.

In the present embodiment, the system 105 provides access to a source code editor comprising the code. The source code editor enables the user provide inputs for modifying the source code through the input device. The inputs may be associated with deletion, addition or customization of existing code associated with the building block. In other words, the integrated development environment provides a suitable platform for editing or modifying the code associated with the identified building block, in order to suit the building block for a specific engineering application.

In a further embodiment, the system 105 provides the user with recommendations for modifying the building block, on the client device 110, based on the query. The recommendations are provided based on, for example, the query and based on documentation associated with the building block. For example, the recommendations may be associated with modifying the building block based on the specific engineering application to be built. The recommendations may be generated based on cosine similarity of the query with information stored in the documentation. The documentation may store pre-determined recommendations for a plurality engineering applications. Based on the cosine similarity, the recommendations are generated as natural language statements and displayed on a user interface of the client device 110.

In a further embodiment, one or more add-on components corresponding to the building block are identified. The one or more add-on components may be identified based on the building block, for example, using a look up table. The look up table may store identifiers of add-on components against identifiers corresponding to each of the building blocks in the repository 117. Once the building block is identified at step 310, the identifier corresponding to the building block is used to identify the add-on components from the look up table. Upon identifying the add-on components from the look up table, the system 105 may recommend the add-on components to the user. More specifically, a list comprising the identified add-on components and corresponding descriptions are displayed to the user on the client device 110. Further, the user may use the input device to select and add one or more of the add-on components to the integrated development environment. Upon adding, the user is provided access to codes of the chosen add-on components through the source code editor. The user may modify the source code of the add-on components if required.

In another embodiment, the one or more add-on components may be identified similar to the building block, i.e., based on vector representations of the keywords in the query and the metadata associated with the one or more add-on components. In yet another embodiment, the add-on components may be identified based on user inputs. For example, the user interface may be configured to display a list of add-on components present in the repository 117 once the building block is identified. The user may choose one or more of the add-on components from the list using the input device.

Figure 4C:
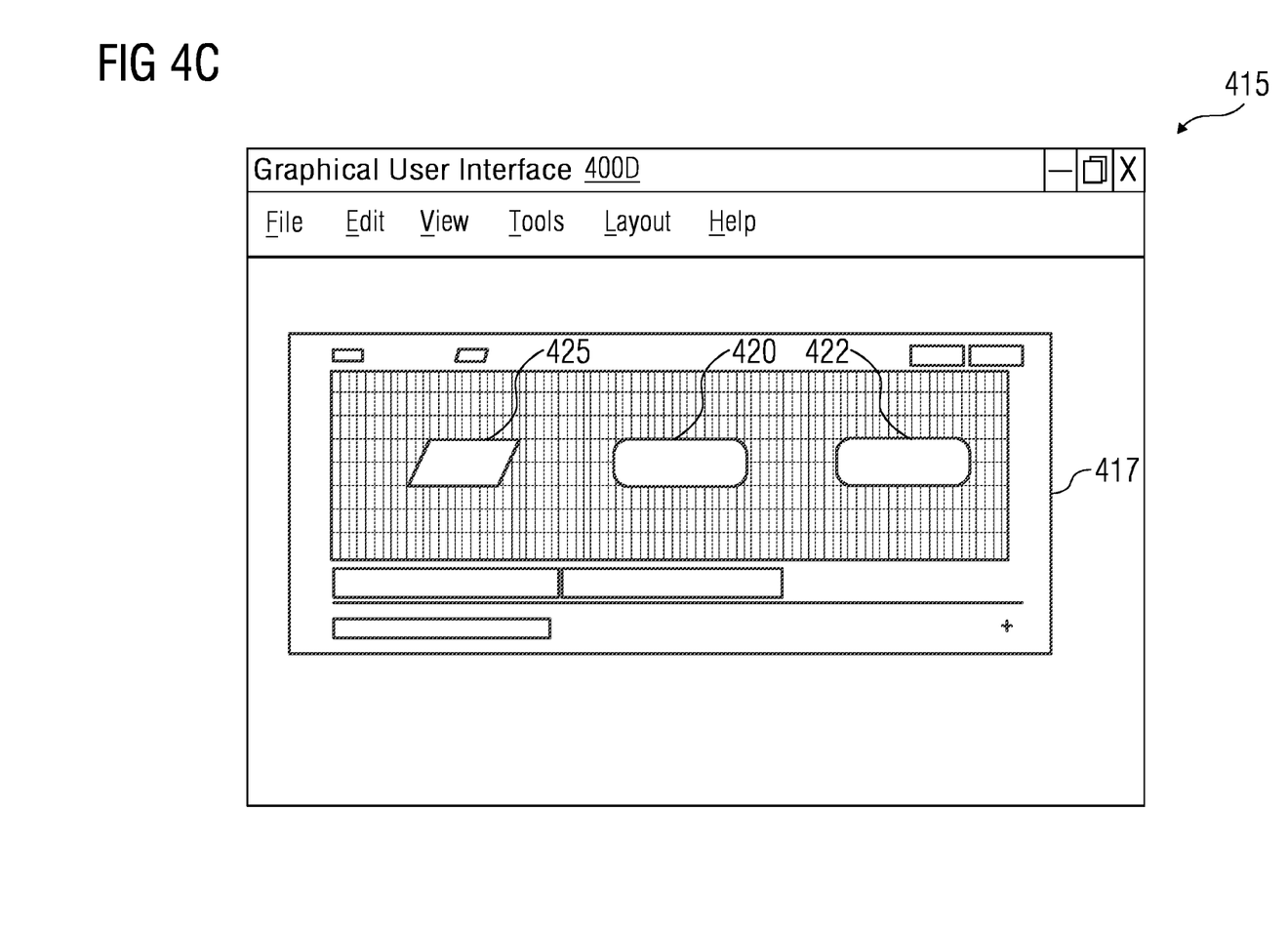
FIG. 4C illustrates an example of a Graphical User Interface indicating how multiple building blocks may be connected in an editing canvas, in accordance with an embodiment of the present invention.

In an embodiment, the user may add a plurality of building blocks to the integrated development environment. The user may further define connections between the building blocks. FIG. 4C illustrates an example of a GUI 415 indicating how multiple building blocks may be connected in an editing canvas 417, in accordance with an embodiment of the present invention. The GUI 415 shows two building blocks 420 and 422 and an add-on component 425. The user may connect the building blocks by, for example, selecting a connector option from a tools palette (not shown) associated with the editing canvas.

In the present embodiment, engineering dependencies among the building blocks 420 and 422 are firstly identified based on a pre-existing set of specifications associated with the building blocks 420 and 422. In an embodiment, the specifications are specified in metadata files associated with each of the building blocks 420 and 422. For example, the specifications may be associated with enabling communication between building blocks.

The communication may be enabled by, for example, APIs. The APIs for a building block may use a plurality of ports and IP addresses. Each port is associated with a specific feature. For example, a first port associated with the building block 420 may be configured to receive sensor data from another building block while a second port associated with the building block 422 may be configured to send sensor data to another building block. The engineering dependencies are identified based on the features associated with the ports. In an implementation, the engineering dependencies are automatically identified by comparing features and/or data types associated with the features, as specified in the metadata files associated with each of the building blocks.

The comparison of the features and/or the data type associated with the features may be performed employing a pattern matching algorithm to compare the metadata files. In another embodiment, the pre-existing set of specifications are stored in a knowledge base. The graph database may be, for example, a knowledge graph. The knowledge graph may be modelled using labelled property graphs or Resource Descriptive Framework (RDF). The knowledge graph is built based on information collected from metadata files, README files, codes, documentation etc.

In an embodiment, the system 105 may further request the user for additional information to identify other engineering dependencies among the building blocks 420 and 422. For example, the system 105 may request the user to provide a Unique Resource Locator (URL) corresponding to configuration data for one or more building blocks in the integrated development environment. The configuration data may be stored by the user in a predefined format, for example as configuration file, in a location specified by the URL. In another example, the system 105 may request the user for information on Application Programming Interfaces corresponding to the connected building blocks. For example, the user may add two building blocks A and B to the integrated development environment. The service B may have a plurality of APIs. In case building block A requires usage of an Application Programming Interface (API) of building block B, the user may be requested to specify which API of building block B is to be used. For example, a list of APIs of building block B may be identified from a corresponding metadata file. Further, the list of APIs may be displayed to the user along with an option to select the required API. Based on the APIs used, data dependencies between the building blocks A and B are determined. More specifically, the data dependencies between the building blocks A and B is determined based on parameters sent from API of building block A and mappings between the parameters and arguments associated with the API of building block B. In an implementation, the user may also be provided an option to manually define mappings between the parameters and the arguments. For example, if names of the parameters associated with building block A are different from the corresponding arguments associated with the building block B, the user may explicitly provide mappings for the parameters and the corresponding arguments. Similarly, the engineering dependencies between the building blocks and the one or more add-on components may also be identified.

Based on the engineering dependencies identified, an orchestrated service is configured from the one or more building blocks and the one or more add-on components. The orchestrated service is further validated in order to ensure that the connected building blocks are compatible. In other words, the orchestrated service is validated to avoid run-time conflicts. The validation is performed by checking compatibility based on factors including, but not limited to, functionalities/features associated with the building blocks, technologies, programming paradigms and software licenses used by the building blocks. The factors for validation of the orchestrated service may be determined based on metadata files or knowledge bases (such as knowledge graphs) storing information associated with the building blocks.

In an embodiment, configuring the orchestrated solution comprises dynamically generating plumbing code for connecting the building blocks and the add-on components. The plumbing code may be generated using for example, a low-code platform such as Mendix. In an implementation, the plumbing code is generated dynamically based on user configuration. For example, the user configuration may include connections between ports of the building blocks, IP addresses associated with the ports etc. that are specified by the user.

The plumbing code facilitates communication among the plurality of building blocks in the orchestrated service. In other words, the plumbing code connects the building blocks as well as the one or more add-on components to create the orchestrated service. In one example, the user may further save the orchestrated service in the repository 117 of the system 105 for future use.

Figure 5:
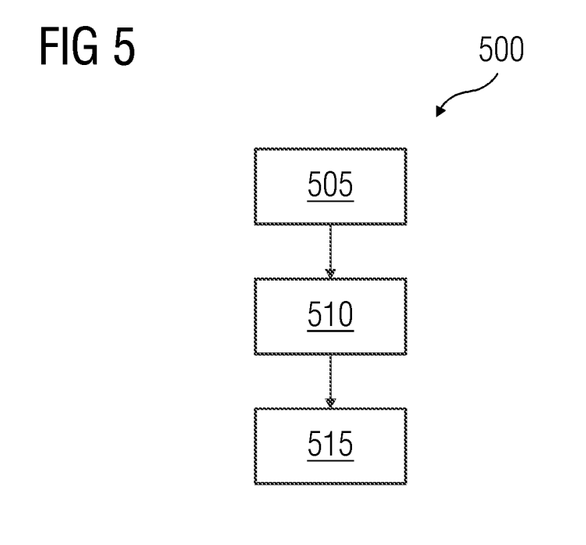
FIG. 5 shows a flowchart of a method for integration of containerized building blocks, in accordance with an embodiment of the present invention.

In another example, the user may choose to deploy the orchestrated service in a suitable environment. In an embodiment, the orchestrated service is deployed in a local container environment such as Docker. In case of an orchestrated service comprising a plurality of building blocks, each of the building blocks may be containerized during development phase. Such containerized building blocks are integrated before deployment in the local container environment. FIG. 5 shows a flowchart of a method 500 for integration of containerized building blocks, in accordance with an embodiment of the present invention.

At step 505, presence of common containers among the plurality of building blocks is identified. For example, the common containers are identified based on information present within configuration files associated with each of the building blocks. In an example, the common containers are identified based on container names or tags present within the configuration files. In addition, ports and configuration of the containers may also be used to identify a common containers. The common container thus identified may be deployed for common access by each of the building blocks. In other words, the common container may be used among the plurality of building blocks in order to avoid creation of separate instances of the same container for each of the building blocks.

At step 510, conflicts associated with ports of the containers associated with the plurality of building blocks is identified based on configuration files associated with the containers. Further, if conflicts are identified, the system 105 requests the user to manually select the ports for the containers in order to resolve the conflict.

At step 515, a script for integration of the containers is executed. In an embodiment, the script is associated with integrating the configuration files associated with the plurality of containers into a single file. In another embodiment, the script is associated with sequentially executing the containers in the local container environment. Similarly, the orchestrated service may also be deployed on an on-premise cluster environment such as Kubernetes or on a cloud-based cluster environment such as AWS Kubernetes (EKS elastic Kubernetes service).

Embodiments of the present invention are not limited to a particular computer system platform, processing unit, operating system, or network. One or more aspects of embodiments of the present invention may be distributed among one or more computer systems, for example, servers configured to provide one or more services to one or more client computers, or to perform a complete task in a distributed system. For example, one or more aspects of embodiments of the present invention may be performed on a client-server system that comprises components distributed among one or more server systems that perform multiple functions according to various embodiments. These components comprise, for example, executable, intermediate, or interpreted code, which communicate over a network using a communication protocol. Embodiments of the present invention are not limited to be executable on any particular system or group of system, and is not limited to any particular distributed architecture, network, or communication protocol.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method of managing software services, the method comprising:
   receiving a query from a client device, by a processing unit, for accessing software package corresponding to at least one building block stored in a repository, wherein the building block is a software component associated with a software service, configured for reuse in a plurality of engineering applications;
   identifying the software package corresponding to the building block from the repository based on the query;
   providing access to the software package corresponding to the building block through an integrated development environment on the client device;
   identifying engineering dependencies among a plurality of building blocks;
   configuring an orchestrated service from the plurality of building blocks based on the engineering dependencies identified, wherein the orchestrated service is associated with a specific engineering application; and
   deploying the orchestrated service in a client environment.

2. The method according to claim 1, wherein identifying the software package corresponding to the building block from the repository based on the query comprises:
   generating a vector representation of the query using a natural language processing algorithm;
   parsing metadata files associated with each of the one or more building blocks in the repository to generate metadata;
   determining vector representations of the metadata using a natural language processing algorithm;
   comparing the vector representation of the query with the vector representation of the metadata associated with each of the one or more building blocks stored in the repository; and
   identifying the building block corresponding to the query based on the comparison.

3. The method according to claim 1, providing access to the software package corresponding to the building block through the integrated development environment comprises:
   receiving one or more inputs for modifying the building block from the client device through the integrated development environment; and
   modifying the building block based on the one or more inputs.

4. The method according to claim 1, further comprising:
   providing recommendations for modifying the building block, on the client device, based on the query.

5. The method according to claim 1, further comprising:
   generating the software package based on a code for the building block and an execution environment associated with the code;
   generating a configuration file for the building block based on the software package; and
   linking the configuration file to a metadata file associated with the building block to generate an executable component, wherein the executable component enables containerized execution of the building block in the execution environment.

6. The method according to claim 1, further comprising:
   identifying one or more add-on components from the repository based on the identified building block.

7. The method according to claim 1, wherein the engineering dependencies are identified based on a pre-existing set of specifications associated with at least one of the building blocks.

8. The method according to claim 1, further comprising:
   dynamically generating plumbing code for facilitating communication among the plurality of building blocks in the orchestrated service.

9. The method according to claim 1, further comprising:
   validating the orchestrated service based on a compatibility of the plurality of building blocks.

10. The method according to claim 1,
    wherein the client environment enables access to the orchestrated service from one or more user devices.

11. An apparatus for managing software services, the apparatus comprising:
    one or more processing units; and
    a memory unit communicatively coupled to the one or more processing units, wherein the memory unit comprises a software service management module stored in the form of machine-readable instructions executable by the one or more processing units, wherein the software service management module is configured to perform a method comprising:
       receiving a query from a client device, by the one or more processing units, for accessing software package corresponding to at least one building block stored in a repository, wherein the building block is a software component associated with a software service, configured for reuse in a plurality of engineering applications;
       identifying the software package corresponding to the building block from the repository based on the query;
       providing access to the software package corresponding to the building block through an integrated development environment on the client device;
       identifying engineering dependencies among a plurality of building blocks;
       configuring an orchestrated service from the plurality of building blocks based on the engineering dependencies identified, wherein the orchestrated service is associated with a specific engineering application; and
       deploying the orchestrated service in a client environment.

12. A cloud-based system for managing software services, the system comprising:
    one or more client devices; and
    the apparatus as claimed in claim 11, communicatively coupled to the one or more client devices, wherein the apparatus is configured to manage software services based on queries received from the one or more client devices.

13. A computer program product, comprising a computer readable hardware storage device having computer readable program code stored therein, said program code executable by a processor of a computer system to implement a method comprising:
    receiving a query from a client device, by the one or more processing units, for accessing software package corresponding to at least one building block stored in a repository, wherein the building block is a software component associated with a software service, configured for reuse in a plurality of engineering applications;
    identifying the software package corresponding to the building block from the repository based on the query;
    providing access to the software package corresponding to the building block through an integrated development environment on the client device;

identifying engineering dependencies among a plurality of building blocks;

configuring an orchestrated service from the plurality of building blocks based on the engineering dependencies identified, wherein the orchestrated service is associated with a specific engineering application; and deploying the orchestrated service in a client environment.

* * * * *